US012692968B2

(12) United States Patent
Duncan et al.

(10) Patent No.: US 12,692,968 B2
(45) Date of Patent: Jul. 28, 2026

(54) CONTROL SYSTEM AND METHODS FOR ADJUSTING TRACTION OF A PIPE NAVIGATION APPARATUS

(71) Applicant: GE INFRASTRUCTURE TECHNOLOGY LLC, Greenville, SC (US)

(72) Inventors: Alexander Kyle Duncan, Niskayuna, NY (US); Katelyn Marie Angeliu, Schenectady, NY (US); Justin Foehner, Schenectady, NY (US); Todd William Danko, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/115,198

(22) PCT Filed: Jul. 29, 2024

(86) PCT No.: PCT/US2024/040026
§ 371 (c)(1),
(2) Date: Mar. 25, 2025

(87) PCT Pub. No.: WO2026/029750
PCT Pub. Date: Feb. 5, 2026

(65) Prior Publication Data
US 2026/0029079 A1      Jan. 29, 2026

(51) Int. Cl.
*F16L 55/32* (2006.01)
*G05D 15/01* (2006.01)
*F16L 55/48* (2006.01)
*F16L 101/30* (2006.01)

(52) U.S. Cl.
CPC .............. *F16L 55/32* (2013.01); *G05D 15/01* (2013.01); *F16L 55/48* (2013.01); *F16L 2101/30* (2013.01)

(58) Field of Classification Search
CPC ....................................................... F16L 55/32
See application file for complete search history.

(56) References Cited

U.S. PATENT DOCUMENTS

| | | | |
|---|---|---|---|
| 5,565,633 A | 10/1996 | Wernicke | |
| 8,024,066 B2 * | 9/2011 | Reverte | H04N 7/185 385/103 |
| 8,234,010 B2 * | 7/2012 | Thompson | G05D 1/0295 901/46 |
| 11,415,553 B2 * | 8/2022 | Howland | G01N 29/265 |

(Continued)

OTHER PUBLICATIONS

International Search Report and Written Opinion for PCT Application No. PCT/US2024/040026, mailed Jan. 31, 2025; 14 pp.

*Primary Examiner* — Michael A Berns
(74) *Attorney, Agent, or Firm* — Armstrong Teasdale LLP

(57) ABSTRACT

A control system for controlling a pipe navigation apparatus in a pipe includes a tether sensor configured to detect release of a tether from a tether guide device. The tether extending from the tether guide device to the pipe navigation apparatus. The control system further includes a traction sensor configured to detect a traction force between the pipe navigation apparatus and the pipe and a controller in communication with the tether sensor and the traction sensor. The controller is configured to automatically control the pipe navigation apparatus to adjust the traction force based on the detected release of the tether from the tether guide device.

20 Claims, 5 Drawing Sheets

(56) References Cited

U.S. PATENT DOCUMENTS

| | | | | |
|---|---|---|---|---|
| 11,585,480 B2 * | 2/2023 | Duncan | .................. | F16L 55/30 |
| 11,841,105 B2 * | 12/2023 | Duncan | .................. | F16L 55/18 |
| 12,031,660 B2 * | 7/2024 | Duncan | .................. | F16L 55/30 |
| 12,111,006 B2 * | 10/2024 | Danko | .................. | F16L 55/18 |
| 12,163,616 B2 * | 12/2024 | Duncan | .................. | F16L 55/32 |
| 12,372,190 B1 * | 7/2025 | Angeliu | .................. | F16L 55/30 |
| 12,474,008 B2 * | 11/2025 | Tan | .................. | F16L 55/48 |
| 2006/0290779 A1 | 12/2006 | Reverte et al. | | |
| 2023/0220943 A1 * | 7/2023 | Duncan | .................. | F16L 55/28 |
| | | | | 73/865.8 |
| 2023/0243457 A1 | 8/2023 | Duncan et al. | | |
| 2025/0075779 A1 * | 3/2025 | Wai | .................. | F16H 1/26 |

* cited by examiner

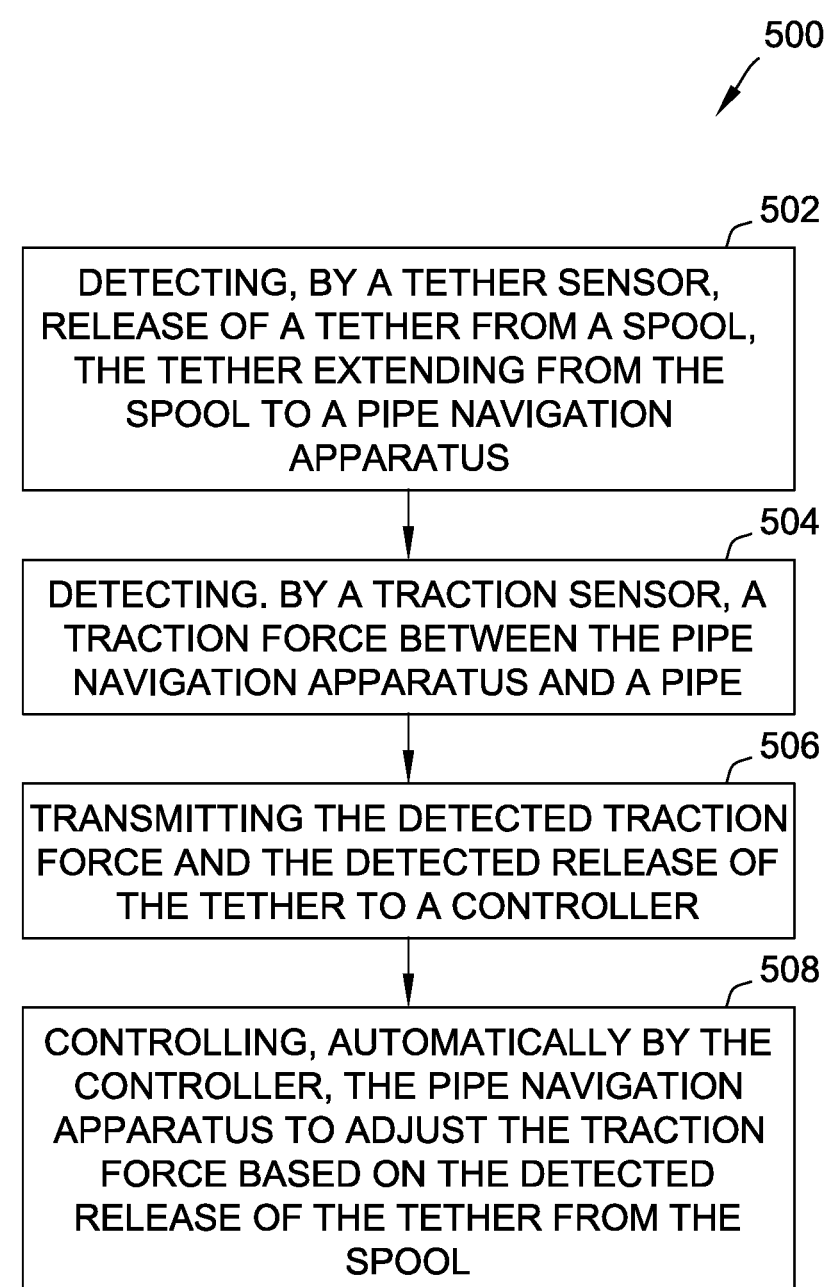

500

502

DETECTING, BY A TETHER SENSOR, RELEASE OF A TETHER FROM A SPOOL, THE TETHER EXTENDING FROM THE SPOOL TO A PIPE NAVIGATION APPARATUS

504

DETECTING. BY A TRACTION SENSOR, A TRACTION FORCE BETWEEN THE PIPE NAVIGATION APPARATUS AND A PIPE

506

TRANSMITTING THE DETECTED TRACTION FORCE AND THE DETECTED RELEASE OF THE TETHER TO A CONTROLLER

508

CONTROLLING, AUTOMATICALLY BY THE CONTROLLER, THE PIPE NAVIGATION APPARATUS TO ADJUST THE TRACTION FORCE BASED ON THE DETECTED RELEASE OF THE TETHER FROM THE SPOOL

FIG. 5

CONTROL SYSTEM AND METHODS FOR ADJUSTING TRACTION OF A PIPE NAVIGATION APPARATUS

STATEMENT REGARDING FEDERALLY SPONSORED RESEARCH AND DEVELOPMENT

This invention was made with Government support under contract number DE-AR0001328 awarded by the Advanced Research Projects Agency-Energy (ARPA-E). The Government has certain rights in this invention.

CROSS REFERENCE TO RELATED APPLICATIONS

This application is a National Stage Entry of International Patent Application No. PCT/US24/40026 filed on Jul. 29, 2024, the contents of which are hereby incorporated herein by reference in their entirety.

BACKGROUND

The field of the disclosure relates to systems for navigating pipes, and more particularly to control systems and methods for controlling traction between a pipe navigation apparatus and a pipe.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and repair. However, the interior cavity of the pipes may be difficult to access for routine maintenance.

Navigation apparatus may traverse a pipe carrying a payload for performing maintenance operations within pipes. At least some known navigation apparatuses utilize a tether that connects the navigation apparatus to one or more exterior components of the navigation system. However, such tethers increase loading on the navigation apparatus as the navigation apparatus travels further into the pipe, which can result in a loss of traction and or slipping of wheels of the navigation apparatus. Moreover, the loading from the tether increases variably the further the navigation apparatus travels into the pipe, thereby resulting in a continuous loss of traction. At least some known navigation apparatuses are driven with a constant traction setting that allows the navigation apparatuses to travel up to a predefined maximum distance. However, such navigation apparatuses apply the maximum loading on an interior surface of the pipe necessary to traverse up to the maximum distance, thereby increasing wear on the pipe.

Accordingly, it would be desirable to provide a system for navigating pipes including a navigation apparatus that automatically adjusts traction to compensate for the variable loading from the tether.

BRIEF DESCRIPTION

In one aspect, a control system for controlling a pipe navigation apparatus in a pipe is provided. The control system includes a tether sensor configured to detect release of a tether from a tether guide device. The tether extending from the tether guide device to the pipe navigation apparatus. The control system further includes a traction sensor configured to detect a traction force between the pipe navigation apparatus and the pipe and a controller in communication with the tether sensor and the traction sensor. The controller is configured to automatically control the pipe navigation apparatus to adjust the traction force based on the detected release of the tether from the tether guide device.

In another aspect, a pipe navigation system for use in navigating a pipe is provided. The pipe navigation system includes a tether assembly including a tether guide device and a releasable tether coupled to the tether guide device. The tether assembly further includes a tether sensor configured to detect release of the tether from the tether guide device. The system further includes a navigation apparatus coupled to the tether. The navigation apparatus includes a body, a wheel, and a traction control assembly coupling the wheel to the body. The traction control assembly is configured to adjust a traction force applied by the wheel on the pipe. The navigation apparatus further includes a traction sensor configured to detect a traction force of the navigation apparatus. The pipe navigation system further includes a controller in communication with the tether sensor and the traction sensor. The controller is configured to automatically control the traction control assembly based on the detected release of the tether from the tether guide device.

In yet another aspect, a method for controlling a pipe navigation apparatus in a pipe is provided. The method includes detecting, by a tether sensor, release of a tether from a tether guide device. The tether extending from the tether guide device to the pipe navigation apparatus. The method further includes detecting, by a traction sensor, a traction force between the pipe navigation apparatus and the pipe and transmitting the detected traction force and the detected release of the tether to a controller. The method further includes controlling, automatically by the controller, the pipe navigation apparatus to adjust the traction force based on the detected release of the tether from the tether guide device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a flow chart of an example method for controlling the navigation apparatus of FIG. 1.

Figure 1:
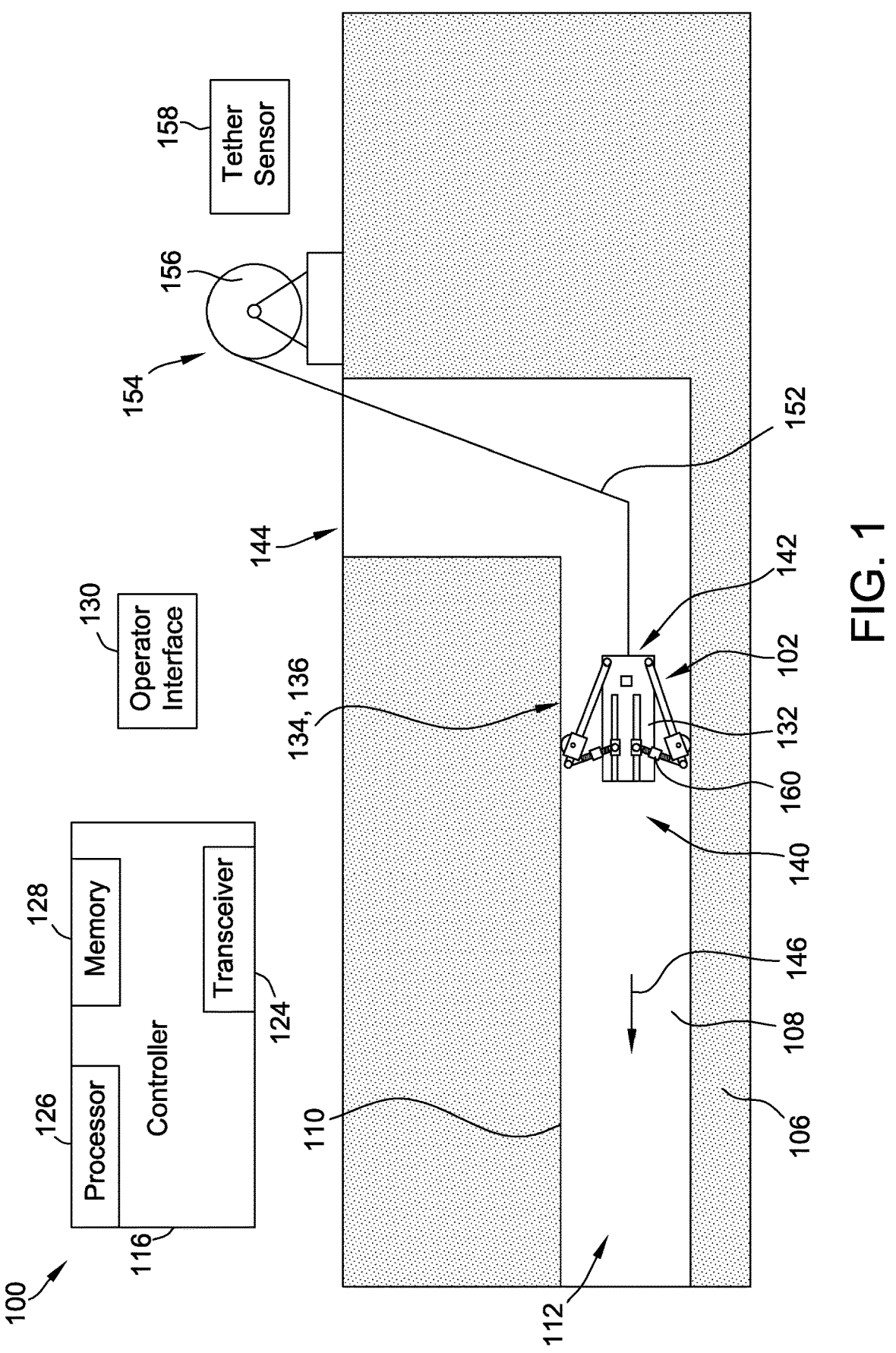
FIG. 1 is a schematic diagram of a pipe treatment system including a navigation apparatus traveling underground.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a key board. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims. range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a key board. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a control system for controlling a pipe navigation apparatus in a pipe. The control system includes a tether sensor configured to detect release of a tether from a spool, the tether extending from the spool to the pipe navigation apparatus and a traction sensor configured to detect a traction force between the pipe navigation apparatus and the pipe. The control system further includes a controller in communication with the tether sensor and the traction sensor. The controller automatically controls the pipe navigation apparatus to adjust the traction force based on the detected release of the tether from the spool. As a result, the control system automatically adjusts traction settings of the navigation apparatus in response to changes in loading from the tether. As an example, as the navigation apparatus travels further into the pipe, the tether sensor detects an increase in the release of tether and the control system automatically increases a traction setting of the navigation apparatus to compensate for the increased loading from the tether. Additionally, as the navigation is retracted, the tether sensor detects the retraction of the tether and the control system automatically lowers the traction setting of the navigation apparatus. As a result, the control system automatically controls the traction settings of the navigation apparatus to compensate for changes in traction resulting from the changes in the loading from the released tether.

FIG. 1 is a schematic diagram of a pipe navigation system 100, alternatively referred to herein as a "system" including a navigation apparatus 102, also referred to herein as a "crawler," traveling underground. For example, navigation apparatus 102 is configured to travel through a pipe 106. Pipe 106 may be any enclosed path through a material. For example, pipe 106 may be a conduit or a tunnel and may have a circular or non-circular cross-section. Pipe 106 includes a sidewall 108 having an interior surface 110 defining an interior cavity 112.

System 100 includes a controller 116 communicatively coupled to navigation apparatus 102. In the example embodiment, controller 116 is configured to provide instructions to move navigation apparatus 102 through pipe 106 and/or to perform inspection or repair operations. Controller 116 includes a transceiver 124, a processor 126, and a memory 128. In some embodiments, controller 116 is positioned remotely from navigation apparatus 102, e.g., controller 116 is located at a base station that enables an operator on an exterior of pipe 106 (shown in FIG. 1) to interact with navigation apparatus 102, and/or controller 116 can be at least partly incorporated into and located on board navigation apparatus 102. Transceiver 124 is communicatively coupled with navigation apparatus 102 and is configured to send information to and receive information from a transceiver of navigation apparatus 102. In some embodiments, transceiver 124 and a transceiver on navigation apparatus 102 communicate wirelessly. In alternative embodiments, navigation apparatus 102 and controller 116 communicate in any manner that enables system 100 to operate as described herein. For example, in some embodiments, controller 116 and navigation apparatus 102 exchange information through a wired link extending between navigation apparatus 102 and controller 116 e.g., by a tether 152, described in further detail below.

In addition, in some embodiments, controller 116 is at least partly located on board navigation apparatus 102 and is configured to execute instructions for controlling components of navigation apparatus 102, such as a maintenance tool and drive systems. For example, controller 116 executes instructions that cause navigation apparatus 102 to move in a selected direction. In alternative embodiments, navigation apparatus 102 includes any controller that enables system 100 to operate as described herein. In some embodiments, controller 116 is not located on board navigation apparatus 102.

In some embodiments, navigation apparatus 102 includes one or more sensors. An operator interface 130 is configured to display information relating to the characteristics detected by navigation apparatus 102 for interpretation by the operator. Operator interface 130 may be included on a remote computing device (not shown) and/or may be incorporated with controller 116. Operator interface 130 may include, among other possibilities, a web browser and/or a client application. For example, in some embodiments, operator interface 130 displays images of interior surface 110 based on received signals. In some embodiments, operator interface 130 allows an operator to input and/or view information relating to control of navigation apparatus 102. In the example embodiment, operator interface 130 is configured to display information relating to the state of one or more of a maintenance tool and a power source for interpretation by the operator. For example, state information may include a position of navigation apparatus 102 along a length of pipe 106.

In various embodiments, processor 126 translates operator inputs into steering, tool motion, camera control, sensor control, sensor motion, and/or any other commands and sends information via transceiver 124 to navigation apparatus 102 via a transceiver of navigation apparatus 102. In some embodiments, operator control of navigation apparatus 102 is in real time, such as through a joystick, a keyboard, a touchscreen, a remote motion capture system, and/or a wearable motion capture system or other interface having similar function. In other embodiments, navigation apparatus 102 is controlled partially or wholly according to a pre-programmed routine. In further embodiments, navigation apparatus 102 is at least partially automated. In some embodiments, an operator inputs information such as operation goals or conditional directions. In further embodiments, information, such as information received by controller 116 from navigation apparatus 102, control data sent to navigation apparatus 102, and additional operator inputs or state information (e.g., location, time, orientation, datalink quality, battery levels, repair material levels, failure mode indicators), is logged into memory 128.

Moreover, in the example embodiment, controller 116 is positioned on the exterior of pipe 106 and communicates with navigation apparatus 102 positioned within interior cavity 112 of pipe 106. For example, controller 116 is configured to send information to navigation apparatus 102 relating to the propulsion and/or steering of navigation apparatus 102 while navigation apparatus 102 is moving within interior cavity 112 of pipe 106 through a wireless connection and/or tether 152. In alternative embodiments, controller 116 and navigation apparatus 102 are configured in any manner that enables system 100 to operate as described herein.

Navigation apparatus 102 includes a body 132 that is configured to fit within interior cavity 112 and travel along the length of pipe 106. Accordingly, navigation apparatus 102 facilitates inspection and/or repair of pipe 106.

In the example embodiment, navigation apparatus 102 includes a drive assembly 134 coupled to body 132. Navigation apparatus 102 is self-propelled by drive assembly 134, meaning that navigation apparatus 102 moves within interior cavity 112 without external propulsion (e.g., a mechanical push or pull force) acting on navigation apparatus 102.

Figure 2:
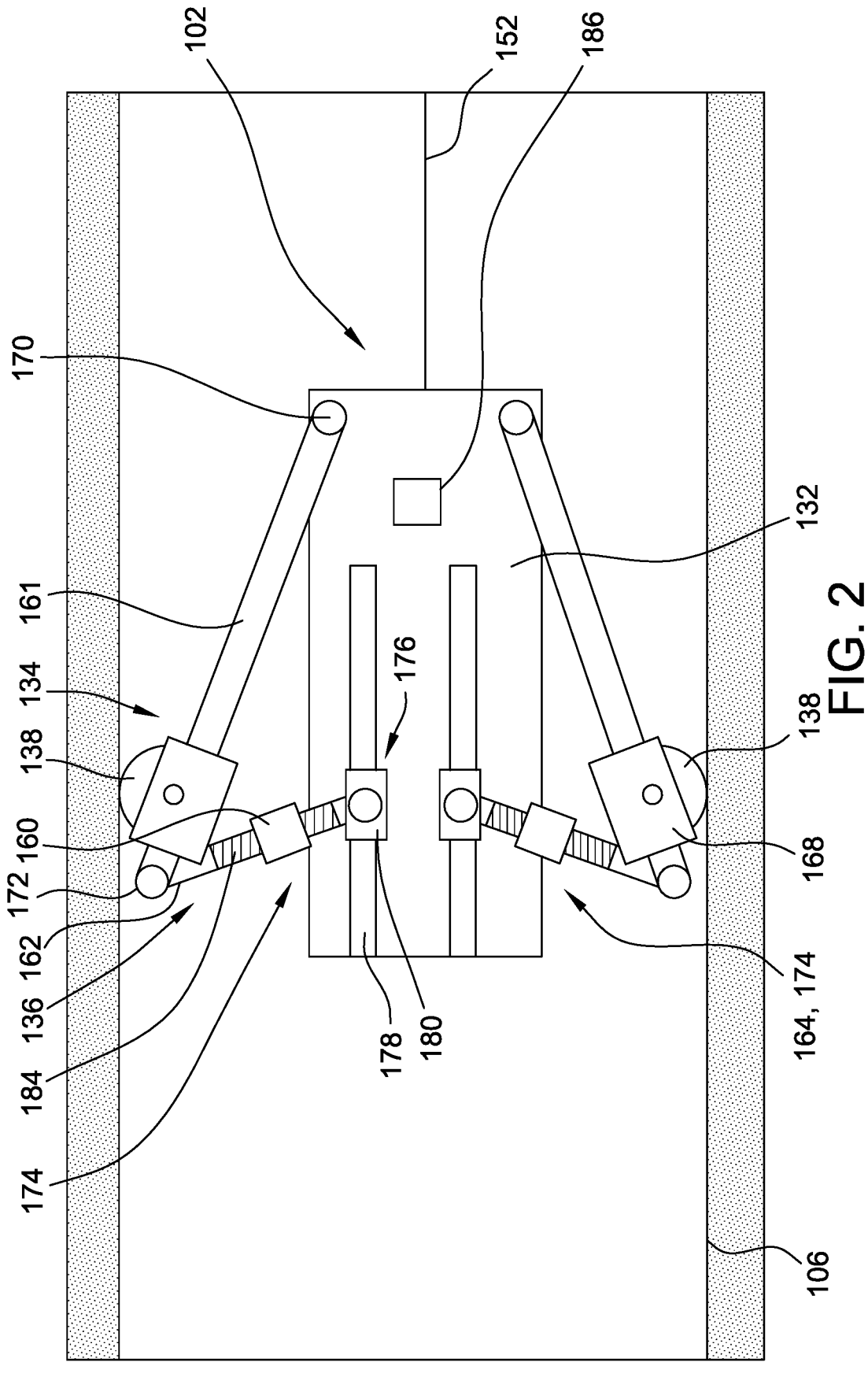
FIG. 2 is an enlarged schematic diagram of a portion of the pipe treatment system of FIG. 1, showing the navigation apparatus traveling underground in a first traction state.

Referring to FIG. 2, drive assembly 134 includes a plurality of arm assemblies 136 extending from body 132. Each of the arm assemblies 136 includes at least two arms 161, 162 pivotably connected to body 132 with a wheel 138 attached at least one of the arms 161, 162. Arm assemblies 136 extend at least partially radially outward from body 132 such that wheels 138 engage interior surface 110 to propel navigation apparatus 102 along pipe 106. Arm assemblies 136 position body 132 of navigation apparatus 102 centrally within pipe 106, such that a central axis of navigation apparatus 102 is generally colinear with a central axis of pipe 106. In the example embodiment, navigation apparatus 102 includes three arm assemblies 136 (two shown in FIG. 2) each having a corresponding wheel 138. In other embodiments, navigation apparatus 102 includes any suitable number of arm assemblies 136 and wheels 138.

Drive assembly 134 further includes a traction control assembly 164 coupling at least one of the wheels 138 to the body 132. Traction control assembly 164 is configured to adjust a traction force applied by the wheels 138 on the pipe 106.

Referring back to FIG. 1, body 132 includes a first or "distal" end 140 and an opposed second or "proximal" end 142. During operation, for example, navigation apparatus 102 may be positioned within interior cavity 112 through an opening 144 in pipe 106, with first end 140 oriented into opening 144 and second end 142 trailing first end 140. In the illustrated embodiment, navigation apparatus 102 travels in a travel direction 146 into pipe 106 from opening 144.

In some embodiments, navigation apparatus 102 includes a repair tool and/or sensor (not shown) configured to perform a maintenance operation within pipe 106. For example, in some embodiments, navigation apparatus 102 includes, without limitation, any of the following: a spray nozzle, an applicator, a drill, a grinder, a heater, a welding electrode, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray).

In addition, in some embodiments, navigation apparatus 102 includes a light source (not shown) configured to irradiate at least a portion of interior cavity 112 to facilitate visual or non-visual steering of navigation apparatus 102 and/or to allow a navigation apparatus to capture images, for example. The light source may be coupled to body 132 and, in some embodiments, may be positionable relative to body 132. In alternative embodiments, navigation apparatus 102 includes any light source that enables navigation apparatus 102 to operate as described herein.

In the example embodiment, tether 152 is releasably coupled to a tether guide device 154 and extends to navigation apparatus 102. In the example embodiment, tether guide device 154 is a spool and includes a rotatable barrel 156, with tether 152 being wound around the barrel 156. In other embodiments, any suitable tether guide device may be used. For example, and without limitation, in some embodiments, tether guide device 152 includes one or more of rollers, a guide track, a guide hole, etc. Tether 152 is coupled to navigation apparatus 102 proximate to or at second end 142. In some embodiments, tether 152 provides at least one of power, communications, (e.g., control communications, sensor signals, video signals, etc.) and supply of a fluid for a fluid treatment to navigation apparatus 102. For example, in embodiments where navigation apparatus 102 includes a spray nozzle, tether 152 may include a fluid supply line coupled in fluid communication with the spray nozzle for providing a fluid treatment to interior surface 110 of pipe 106. In other embodiments, tether 152 and a fluid supply line may be separate independent lines coupled to body 132.

Pipe navigation system 100 includes a tether sensor 158 in communication with controller 116 and configured to measure a length of tether 152 released from spool 154. In the example embodiment, a weight of the tether 152 is substantially uniform along the length of the tether 152 and the length of the tether 152 released is directly correlated with a weight of the tether 152 released or, more specifically, loading of the tether 152 on navigation apparatus 102. In the example embodiment, tether sensor 158 includes a rotary position sensor, such as an odometry sensor, provided on spool 154 and coupled to barrel 156. Tether sensor 158 detects rotation of barrel 156 and provides readings indicating the detected rotation to controller 116. During operation, as navigation apparatus 102 travels further into pipe 106 a number of rotations of spool 154 increases, indicating increasing length of tether 152 released from the spool 154. In other embodiments any sensor suitable to detect a parameter of tether 152 associated with the length of tether released from spool 154 may be used. For example, and without limitation, in some embodiments, tether sensor 158, additionally or alternatively, detects a mass and/or weight of spool 154 and/or of a portion of the tether released from the spool 154.

Navigation apparatus 102, and specifically traction control assembly 164 of navigation apparatus 102, includes at least one traction sensor 160 configured to detect a traction force of the navigation apparatus 102. The detected traction force may include an outward force applied by wheels 138 (shown in FIG. 2) on pipe and/or the equal and opposite reciprocal force (i.e., normal force) applied by the pipe 106 on the wheel 138. In particular, in the example embodiment, traction control assembly 164 (shown in FIG. 2) includes three traction sensors 160 each detecting a traction force of a corresponding one of wheels 138 on pipe 106. Each of the traction sensors 160 is in communication with the controller 116 and transmits the detected traction force to the controller 116 during operation of navigation apparatus 102. The traction sensors 160 each measure a parameter associated with traction control assembly 164 and/or drive assembly 134 (e.g., such as compression of an elastic element 184, as detailed below), and the detected traction force is determined by the controller 116 based on the measured parameter.

Controller 116 is configured to automatically control traction control assembly 164 based on the detected length of released tether 152. In particular, controller 116 automatically controls traction control assembly 164 to adjust the traction forces on one or more of wheels 138. The length of released tether 152 includes the portion of tether 152 that is released from (i.e., not wound around) barrel 156 of spool 154. For example, during operation, spool 154 supports a portion of tether 152 that is positioned on spool 154 while the released portion of tether 152 (e.g., the portion of tether extending from spool 154 to navigation apparatus 102) may rest on a lower surface of pipe 106 (e.g., by gravity), such at least a portion of the released portion of tether 152 is at least partially supported or carried by navigation apparatus 102.

The released portion of tether 152 applies a frictional resistance force on navigation apparatus 102 (e.g., resulting from friction between tether 152 and pipe 106) that increases as navigation apparatus 102 travels further into pipe 106 and more of tether 152 is released from spool 154. The frictional resistance force may reduce traction between wheels 138 and pipe 106, thereby leading to slipping or stalling of navigation apparatus 102. In the example embodiment, controller 116 automatically adjusts traction control device based on the amount (e.g., length) of tether 152 that is released from spool 154 to counteract the increase in frictional resistance force applied on the navigation apparatus 102 from the tether 152. In the example embodiment, tether 152 has a uniform mass across the length of tether 152 such that an increase in the length of tether released is directly correlated with changes to the frictional resistance force applied on navigation apparatus 102.

In the example embodiment, controller 116 is also configured to adjust traction control assembly 164 based on the detected traction force from one or more of the traction sensors 160. For example, in some embodiments, memory 128 stores predetermined ranges of traction forces (e.g., minimum and/or maximum traction force). If one or more of traction sensors 160 detects a lowered traction force for one or more of the wheels 138, traction control assembly 164 may be automatically controlled to provide increase traction for the one or more wheels 138.

Figure 3:
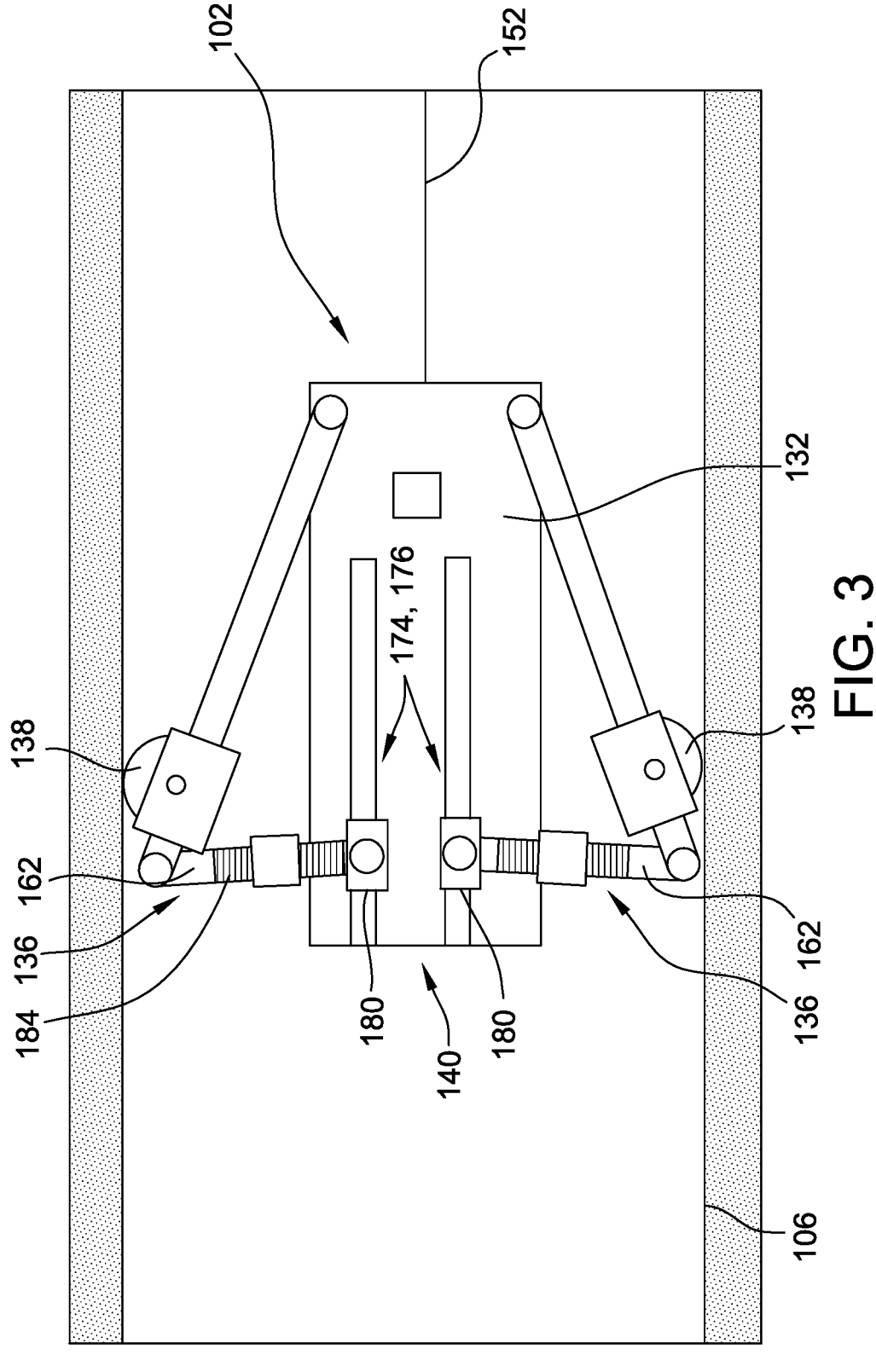
FIG. 3 is a schematic diagram of a portion of the pipe treatment system of FIG. 2, showing the navigation apparatus in a second traction state.

FIG. 2 shows an enlarged view of navigation apparatus 102 in a first traction state. FIG. 3 shows navigation apparatus 102 in a second traction state.

Referring to FIG. 2, in the example embodiment, arm assemblies 136 each include a drive arm 161, alternatively referred to herein as a "first arm" and a traction arm 162, alternatively referred to herein as a "second arm". Each of the arm assemblies 136 are substantially identical.

Drive arm 161 is pivotally coupled to body 132 by a first pivot coupling 170. Wheels 138 are each coupled to and positioned on drive arm 161. Traction arm 162 is pivotably coupled to drive arm 161 by a second pivot coupling 172 and is pivotably coupled to body 132.

Traction control assembly 164 includes a plurality of traction control devices 174, and in particular, one traction control device 174 for each arm assembly 136 of navigation apparatus 102 (i.e., traction control assembly 164 includes three traction control devices 174 corresponding to the three arm assemblies 136). Two traction control devices 174 are shown in FIG. 2. Each of the traction control devices 174 are substantially identical. Each traction control device 174 includes a screw drive 176 coupling the corresponding traction arm 162 to body 132. Screw drive 176 includes an axial screw 178 attached to body 132 and a carriage 180 movably coupled to the axial screw 178. Traction arm 162 is coupled to carriage 180 by a third pivot coupling 182. The screw drive 176 is operable to move the carriage 180 axially along the screw 178 (i.e., to the left or right of the page in FIG. 2) to control a position of wheels 138 and/or the traction force. In the example embodiment, each wheel 138 has a corresponding traction control device 174 such that the traction for each wheel 138 may be independently adjusted relative to one another by control of the corresponding screw drive 176. In other embodiments, traction control assembly 164 includes a single screw drive 176 and carriage 180, with each of the arm assemblies 136 being pivotably connected to the carriage 180.

Traction control device 174 is a series elastic actuator and includes an elastic element 184 coupled to, and in the example embodiment, positioned on, traction arm 162. In the example embodiment, the elastic element 184 is a compression spring, though in other embodiments any suitable elastic element 184 may be used. In the example embodiment, the elastic element 184 extends along a length of traction arm 162 and is configured to provide an increased outward force to wheel 138 under compression. During operation, the traction force for each wheel 138 may be adjusted by selectively adjusting the traction control device 174 to pivot the traction arm 162 and compress the elastic element 184.

In the example embodiment, traction sensor 160 detects a compression of elastic element 184. Traction sensor 160 may include a displacement sensor that measures a physical characteristic of elastic element 184, such as a compression of elastic element 184 by measuring a length of elastic element 184. Additionally or alternatively, traction sensor 160 includes a load cell that measures a force acting on elastic element 184. Based on the measured characteristic of the elastic element, the traction force may be determined (e.g., by controller). In particular, one or more algorithms are stored in memory 128 (shown in FIG. 1) and based on the geometric characteristics of navigation apparatus. During operation, controller 116 determines the traction force by executing the one or more algorithms using the measured characteristic of elastic element 184 as an input. In other embodiments, traction sensor 160 may include any sensor that measures a physical characteristic of navigation apparatus 102, based on which the traction force may be derived. For example, in one embodiment, the traction sensor 160, additionally or alternatively, includes a displacement sensor that measures a displacement of a portion of wheel 138.

In the example embodiment, navigation apparatus 102 includes an inertial sensor 186 coupled to body 132 of navigation apparatus 102. The inertial sensor 186 may be an Inertial Measurement Unit ("IMU") that is configured to detect whether the navigation apparatus 102 is moving. During operation, controller 116 may automatically control traction control assembly 164 based on readings from the inertial sensor 186 and an operating state of navigation apparatus 102. For example, if navigation apparatus 102 is commanded to a forward drive state and inertial sensor 186 does not detect that navigation apparatus 102 is moving, controller 116 may automatically control traction assembly 164 to increase the traction force of one or more of wheels 138. In some embodiments, navigation apparatus 102 includes only one of inertial sensor 186 and traction sensor 160.

In the example embodiment, drive assembly 134 includes a plurality of motor assemblies 168, which each motor assembly 168 driving a corresponding one of wheels 138. Motor assemblies 168 are coupled to a respective drive arm 161 and are operatively coupled to wheels 138. Motor assemblies 168 drive rotation of the wheels 138 for driving navigation apparatus 102 along pipe. In other embodiments, motor assemblies 168 may be coupled to any other suitable component of navigation apparatus 102 that enables navigation apparatus 102 to operate as described herein.

During operation, navigation apparatus 102 is driven through pipe 106 in a drive configuration, with wheels 138 each in contact with pipe 106 and in the first traction state. After a predetermined length of tether 152 has been released from the spool 154 (shown in FIG. 1), controller 116 automatically controls traction control assembly 164 may adjust the traction arms 162 to increase the traction force to a second traction state, as shown in FIG. 3. As navigation apparatus 102 continues further travel into the pipe 106, and the length of released tether 152 is increased, controller 116 continues to automatically increment traction states of navigation apparatus 102, increasing traction of the navigation apparatus 102. When navigation apparatus 102 is withdrawn from pipe 106 traveling in the opposite direction (e.g., opposite direction 146 shown in FIG. 1), controller 116 my automatically decrement the traction states of navigation apparatus 102 in substantially the same manner.

Referring to FIG. 3, each of the arm assemblies 136 is shown in an increased traction state, relative to the first traction state shown in FIG. 2. In the example embodiment, to increase the traction state of the arm assemblies 136, the screw drives 176 are controlled such that carriages 180 are moved axially forward (i.e., toward first end 140) on body 132. Movement of the carriages 180 causes the traction arms 162 to pivot forward, thereby compressing elastic elements 184 and increasing the traction force at wheels 138.

In some operations, traction control devices 174 are adjusted individually to maintain a desired orientation and/or position of navigation apparatus 102 within pipe 106. For example, in some embodiments, traction control devices 174 are adjusted such that navigation apparatus 102 is maintained in a central position within pipe (also referred to herein as a "centering height"). Various orientations of navigation apparatus 102, such as pitch, yaw, or roll, within pipe 106 may be controlled by selective adjustment of one or more of the traction control devices 174. Additionally, traction control devices 174 may be controlled based on pipe geometry, such as a change in pipe diameter.

Figure 4:
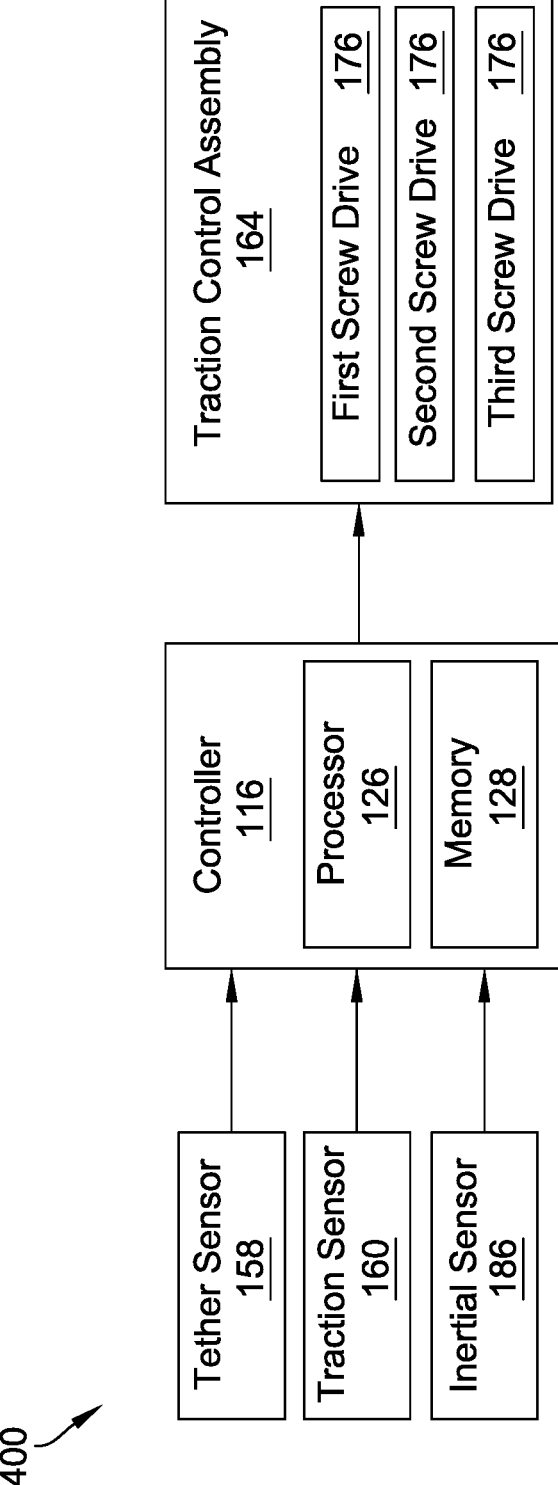
FIG. 4 is a schematic block diagram of a control system for controlling the navigation apparatus of FIG. 1.

FIG. 4 is a schematic diagram showing a control system 400 for controlling navigation apparatus 102 shown in FIGS. 1-3. As shown in FIG. 4, controller 116 is in communication with, and receives readings from each of the tether sensor 158, traction sensor 160, and inertial sensor 186. Based on the readings from one or more of tether sensor 158, traction sensor 160, and inertial sensor 186, controller 116 provides control signals to traction control assembly 164, and specifically to at least one of the first screw drive 176, second screw drive 176, and third screw drive 176.

In the example embodiment, control system 400 is a "closed loop" control system that automatically controls traction control assembly 164 to maintain predetermined traction forces and a predetermined position and/or orientation of navigation apparatus 102 within pipe 106. During operation, controller 116 continually adjusts control of traction control assembly 164 based on the readings from tether sensor 158, traction sensor 160, and/or inertial sensor 186.

In one embodiment, controller 116 automatically controls traction control assembly 164 initially based on the loading of tether 152 (shown in FIG. 1), as detected by tether sensor 158, based on predetermined set points, and adjusts control from the predetermined set points based on feedback from at least one of traction sensor 160 and inertial sensor 186. For example, in one embodiment memory 128 stores predetermined set points for traction control assembly 164 that are each associated with ranges of length of tether 152 released from spool 154, such as a setting for five feet of tether 152 released, ten feet of tether 152 released, fifteen feet of tether released, etc. After tether sensor 158 detects a change in the length of tether 152 released from the first range below five feet and the second range above five feet, controller 116 automatically controls traction control assembly 164 to an increased traction state based on preprogrammed controls. After traction control assembly 164 is adjusted, controller 116 may determine whether traction sensor 160 and/or inertial sensor 186 are within predefined ranges and make follow-on adjustments to traction control assembly 164 based on the traction sensor 160 and inertial sensor 186 readings. Additionally or alternatively, the predetermined set points stored in memory include ranges of loading on navigation apparatus 102 from tether 152 and controller 116 determines the tether loading based on the length of the released tether 152 and stored values indicating a weight of the tether 152.

In some embodiments, controller 116 is further in communication with a position sensor (not shown) that detects one of a position and/or orientation of navigation apparatus 102 within pipe 106. In some such embodiments, controller 116 further automatically controls traction control assembly 164 to maintain a position and/or orientation of navigation apparatus 102 within predefined ranges.

In some embodiments, controller 116 is configured to generate an alert or take other preventative action based on readings provided by one or more of tether sensor 158, traction sensor 160, inertial sensor 186, and or other sensors of navigation apparatus 102. For example, in one embodiment, controller 116 is in communication with motor sensors (not shown) configured to detect operation of motor assemblies 168 (shown in FIG. 2). If operation of motor assemblies 168 falls outside predefined operating parameters, such as a current draw of motor assemblies 168 exceeding a predefined limit, controller 116 may automatically generate an alert indicating that the navigation apparatus 102 is at a maximum travel distance and/or take other preventative action.

FIG. 5 is a flow chart of an example method 500 for controlling a pipe navigation apparatus 102 in a pipe 106 (shown in FIG. 1). In reference to FIGS. 1-4, method 500 includes detecting 502, by a tether sensor 158, release of a tether 152 from a spool 154, the tether 152 extending from the spool 154 to a pipe navigation apparatus 102. Method 500 further includes detecting 504 by a traction sensor 160, a traction force between the pipe navigation apparatus 102 and the pipe 106. Method 500 further includes transmitting 506 the detected traction force and the detected release of the tether 152 to a controller 116. Method 500 further includes controlling 508, automatically by the controller 116, the pipe navigation apparatus 102 to adjust the traction force based on the detected release of the tether 152 from the spool 154.

In some embodiments method 500 further includes receiving, after adjusting the traction force, a second detected traction force from the traction sensor, determining (e.g., by the controller 116) whether the second detected traction force is within a predetermined range, and controlling, automatically, the pipe navigation apparatus 102, based on the determination. In some embodiments, controlling the pipe navigation apparatus 102 to adjust the traction force is performed by controlling traction control assembly 164 to increase force on one or more of wheels 138 of navigation apparatus 102.

In some embodiments, method 500 further includes determining a length of the tether 152 released from the spool 154 based on the detected release of the tether 152 from the spool 154 and determining a loading of the released tether 152 on the pipe navigation apparatus 102 based on the length of the tether 152 released from the spool 154.

An example technical effect of the methods, systems, and apparatus described herein includes at least one of: (a) improving travel distance of navigation apparatus; (b) improving towing capacity of navigation apparatus; (c) reducing wear on pipes from navigation apparatus; (d) improved control over positioning and orientation of navigation apparatuses in a pipe; (e) reducing potential for human error in controlling traction of navigation apparatuses in a pipe; (f) improving ability of navigation apparatuses to traverse pipes having a low structural integrity.

Example embodiments of systems and methods for use in pipe maintenance operations are described above in detail.

The methods and systems are not limited to the specific embodiments described herein, but rather, components of systems and/or steps of the methods may be utilized independently and separately from other components and/or steps described herein. For example, the method may also be used in combination with other components, and are not limited to practice only with pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for controlling a pipe navigation apparatus in a pipe, said control system comprising:

a tether sensor configured to detect release of a tether from a tether guide device, the tether extending from the tether guide device to the pipe navigation apparatus;

a traction sensor configured to detect a detected traction force between the pipe navigation apparatus and the pipe; and a controller in communication with said tether sensor and said traction sensor, said controller configured to automatically control the pipe navigation apparatus to adjust a traction force between the pipe navigation apparatus and the pipe based on the detected release of the tether from the tether guide device.

2. The control system of claim 1, wherein adjustment of the traction force is further based on the detected traction force.

3. The control system of claim 1, wherein the detected traction force is a first detected traction force, and wherein said controller is further configured to:

receive, after adjusting the traction force, a second detected traction force from said traction sensor;

determine whether the second detected traction force is within a predetermined range; and automatically control the pipe navigation apparatus based on the determination.

4. The control system of claim 1, wherein said traction sensor is configured to measure compression of an elastic element of the pipe navigation apparatus, and wherein said controller is further configured to determine the detected traction force based on the measured compression of the elastic element.

5. The control system of claim 1, wherein said controller is further configured to:

determine a length of the tether released from the tether guide device based on the detected release of the tether from the tether guide device; and determine a loading of the released tether on the pipe navigation apparatus based on the length of the tether released from the tether guide device.

6. The control system of claim 5, wherein said controller comprises a memory storing a predetermined weight of the tether, and wherein the determining the loading of the released tether is based on the predetermined weight.

7. The control system of claim 5, wherein said tether guide device comprises a spool and said tether sensor comprises a rotary position sensor configured to measure rotation of the tether guide device.

8. The control system of claim 1, wherein controlling the pipe navigation apparatus to adjust the traction force includes controlling a traction control assembly of the pipe navigation apparatus to pivot an arm of the pipe navigation apparatus, the arm coupling a wheel of the pipe navigation apparatus to a body of the pipe navigation apparatus.

9. The control system of claim 8, wherein the arm includes a compression spring, and wherein pivoting the arm compresses the compression spring and increases the traction force at the wheel.

10. The control system of claim 1 further comprising an inertial sensor configured to detect whether the pipe navigation apparatus is moving, wherein said controller is further configured to:

provide a drive command to the pipe navigation apparatus;

determine, after providing the drive command, that the pipe navigation apparatus is not moving based on readings from the inertial sensor; and control the pipe navigation apparatus to increase the traction force based on the determination.

11. The control system of claim 1, wherein said controller is further configured to maintain the pipe navigation in at least one of a predefined orientation and predefined position within the pipe while the traction force is adjusted.

12. A pipe navigation system for use in navigating a pipe, said pipe navigation system comprising:

a tether assembly comprising a tether guide device and a releasable tether coupled to said tether guide device, said tether assembly further comprising a tether sensor configured to detect release of said tether from said tether guide device;

a navigation apparatus coupled to said tether, said navigation apparatus comprising a body, a wheel, and a traction control assembly coupling said wheel to said body, said traction control assembly configured to adjust a traction force applied by said wheel on the pipe, said navigation apparatus further comprising a traction sensor configured to detect a detected traction force of said navigation apparatus; and a controller in communication with said tether sensor and said traction sensor, said controller configured to automatically control the traction control assembly based on the detected release of said tether from said tether guide device.

13. The pipe navigation system of claim 12, wherein adjustment of the traction force is further based on the detected traction force.

14. The pipe navigation system of claim 12, wherein the detected traction force is a first detected traction force, and wherein said controller is further configured to:

receive, after adjusting the traction force, a second detected traction force from said traction sensor;

determine whether the second detected traction force is within a predetermined range; and automatically control said traction control assembly based on the determination.

15. The pipe navigation system of claim 12, wherein said traction control assembly comprises an elastic element, and wherein said controller is further configured to determine the detected traction force based on the measured compression of said elastic element.

16. The pipe navigation system of claim 12, wherein said controller is further configured to:

determine a length of said tether released from said tether guide device based on the detected release of said tether from said tether guide device; and determine a loading of said tether on said navigation apparatus based on the determined length, wherein said controller comprises a memory storing a predetermined weight of said tether, and wherein the determining the loading of said tether is based on the predetermined weight.

17. The pipe navigation system of claim 16, wherein said tether sensor comprises a rotary position sensor configured to measure rotation of said tether guide device.

18. A method for controlling a pipe navigation apparatus in a pipe, said method comprising:

detecting, by a tether sensor, release of a tether from a tether guide device, the tether extending from the tether guide device to the pipe navigation apparatus;

detecting, by a traction sensor, a detected traction force between the pipe navigation apparatus and the pipe;

transmitting the detected traction force and the detected release of the tether to a controller; and controlling, automatically by the controller, the pipe navigation apparatus to adjust a traction force between the pipe navigation apparatus and the pipe based on the detected release of the tether from the tether guide device.

19. The method of claim 18, wherein the detected traction force is a first detected traction force, the method further comprising:

receiving, after said adjusting the traction force, a second detected traction force from said traction sensor;

determining whether the second detected traction force is within a predetermined range; and controlling, automatically, the pipe navigation apparatus based on the determination.

20. The method of claim 18 further comprising:

determining a length of the tether released from the tether guide device based on the detected release of the tether from the tether guide device; and determining a loading of the released tether on the pipe navigation apparatus based on the length of the tether released from the tether guide device.

* * * * *